United States Patent [19]

Weihrauch

[11] Patent Number: 5,498,918
[45] Date of Patent: Mar. 12, 1996

[54] ROTOR FOR AN ELECTRIC MACHINE

[75] Inventor: Niels C. Weihrauch, Lindewitt, Germany

[73] Assignee: Danfoss A/S, Nordberg, Denmark

[21] Appl. No.: 204,219

[22] PCT Filed: Sep. 3, 1992

[86] PCT No.: PCT/DK92/00262

§ 371 Date: Mar. 2, 1994

§ 102(e) Date: Mar. 2, 1994

[87] PCT Pub. No.: WO93/05563

PCT Pub. Date: Mar. 18, 1993

[30] Foreign Application Priority Data

Sep. 9, 1991 [DK] Denmark ................... 1573/91

[51] Int. Cl.$^6$ ........................................ H02K 1/22
[52] U.S. Cl. ................... 310/261; 310/44; 310/211; 310/216
[58] Field of Search ................... 310/211, 44, 261, 310/182, 183, 197, 201, 216, 262, 264, 265, 42

[56] References Cited

U.S. PATENT DOCUMENTS

| | | | |
|---|---|---|---|
| 2,012,368 | 8/1935 | Zetsche | 310/261 |
| 2,648,788 | 8/1953 | Fleischer | 310/211 |
| 2,944,171 | 7/1960 | Alger | 310/211 |
| 4,309,635 | 1/1982 | Sei et al. | 310/211 |
| 4,362,959 | 12/1982 | Bartheld et al. | 310/211 |
| 4,439,704 | 3/1984 | Adelski et al. | 310/211 |
| 4,796,353 | 1/1989 | Mantovani | 310/211 |
| 5,130,596 | 7/1992 | Umeki | 310/44 |

FOREIGN PATENT DOCUMENTS

| | | |
|---|---|---|
| 899226 | 12/1953 | Germany . |
| 1513757 | 7/1969 | Germany . |
| 10910 | 1/1979 | Japan . |
| 62-054 | 2/1987 | Japan . |

*Primary Examiner*—R. Skudy
*Attorney, Agent, or Firm*—Lee, Mann, Smith, McWilliams, Sweeney & Ohlson

[57] ABSTRACT

The invention relates to a rotor for an electric machine, particularly to a rotor for a hermetic refrigerating compressor. The rotor core contains a number of axial slots, containing the electric conductors of the rotor, which are short-circuited by short-circuiting rings. The rotor has a spindle hole with at least one increased internal diameter for accommodating the bearing neck of the motor. The increased internal diameter of the core results in increased magnetic field strength in the area with increased internal diameter. The invention reduces the magnetic field strength in the area with increased internal diameter by the axial slots having varying profiles in their longitudinal direction.

7 Claims, 2 Drawing Sheets

ROTOR FOR AN ELECTRIC MACHINE

BACKGROUND OF THE INVENTION

The present invention relates to a rotor for an electric machine, in particular for a motor for a hermetic refrigerating compressor, where the rotor has a core of magnetically conductive material with a central spindle hole and with a number of axially extended slots, which are filled with an electrically conductive material for the formation of electric conductors in the rotor, where the conductors are short-circuited by short-circuiting rings, and where the spindle hole has at least two different internal diameters.

Rotors for electric machines of the type mentioned are commonly known from asynchrous motors, and these and their mode of operation must be assumed to be known. If a motor shall operate with one bearing only, relatively high demands are made to the length of the bearing. Hermetic refrigerating compressors operate with a joint bearing for both motor and compressor, and in order to obtain an extremely compact construction it is sometimes necessary to place part of the neck of the bearing internally in the rotor. In these cases it is necessary to increase the internal diameter in a part of the axial direction of the spindle. Where the internal diameter has been increased, the concentration of the lines of magnetic flux is increased in relation to the part of the rotor without any increase of the internal diameter. If the rotor is highly magnetically loaded, a partial magnetic saturation may occur in the iron in the area where the internal diameter has been increased.

SUMMARY OF THE INVENTION

The object of the invention is to indicate a rotor designed in such a manner that magnetic saturation does not occur in areas with increased internal diameter.

This is achieved as initially described and by giving the axial slots a varying profile in their longitudinal direction and the sectional area of the slots can be smaller where the sectional area of the spindle hole is larger, and vice versa.

As a result of this the loss of magnetic power in the iron can be maintained at a uniform level in the entire axial direction of the rotor. The axially disposed slots containing the electric conductors can be designed so that the least possible magnetic resistance is encountered, without substantially increasing the electrical resistance in the conductors. In this manner it is avoided that the iron approaches saturation, and thereby a better total efficiency of the electromotor is achieved. It will also bee possible on the basis of knowledge of the course of the lines of magnetic flux in the rotor to design the slots with the highest possible consideration to the course of the lines of magnetic flux, so that a local saturation of the core is avoided. The increased concentration of the lines of magnetic flux which would occur due to the increased internal diameter of the central hole of the core, might bee reduced by designing the slots in areas with a larger internal diameter with consideration to the relatively smaller area of magnetically conductive core volume.

The invention is embodied by reducing the extention of the slots in the direction of the centre in the part of the rotor where the spindle hole has the largest internal diameter. As a result the sectional area of the core in the magnetic yoke is maintained approximately constant in spite of the varying internal diameter.

The invention is embodied by constructing the core of a laminated magnetically conductive material, where the length-wise varying profile of the slots is produced by giving the slots in the single layers of magnetically conductive material varying sizes and/or varying shape. The result of this is that the traditional, known rotor, which consists of a stack of punched, magnetically conductive disks, can be produced by giving the punched disks varying profiles, and the disks of magnetically material are then stacked so that a varying profile is obtained in the axial direction.

The invention can be embodied by producing the core by powder technology. As a result it is possible to use as a starting point the short-circuiting rings and the longitudinal conductors, where the conductors have been designed with varying sectional area. The rotor is produced by packing under pressure a magnetically conductive powder around the combined conductors and short-circuiting rings. The compressed core may then by possible, subsetfleet heat treatment achieve the required properties for serving as rotor in an electromotor.

The invention is embodied by casting an electrically conductive material in the slots. As a result, the slots can with a high degree of certainty be filled with the electric conductor in the longitudinal slots. By the total filling of the slots the absolutely least possible ohmic resistance is achieved, which again leads to an increase of the efficiency of the motor. By the casting procedure it is possible to fill the slots in spite of the varying sectional area.

The invention is embodied by designing the conductors, which shall fill the slots, as bars which are electrically connected to short-circuiting rings. As a result, the electric conductors can be made of another material than the short-circuiting rings. At the same time it becomes possible to produce slots and short-circuiting rings from a conductive material with so high a melting point that the casting in the core is not rendered difficult. Slots and short-circuiting rings shall be assembled with the smallest possible electrical resistance. For example, the assembly may be accomplished by clamping, soldering, or welding.

The invention is embodied by making the core wholly or partially encircle the slots. As a result, the longitudinal slots can be designed with the maximum regard to the air gap between stator and rotor. The invention can be embodied by encircling the slots in a part of the core, while in another part the slots are open, or that all slots are open.

BRIEF DESCRIPTION OF THE DRAWINGS

The invention is described in the following with reference to the drawings, showing in FIG. 1 a radiograph of the core, displaying three slots filled with magnetically conductive material, FIG. 2 a disk of the rotor with a slot configuration corresponding to the small spindle hole in FIG. 1, and FIG. 3 showing correspondingly a disk of the rotor, displaying the slot configuration corresponding to the large spindle hole in FIG. 1.

DETAILED DESCRIPTION OF THE INVENTION

Figure 1:
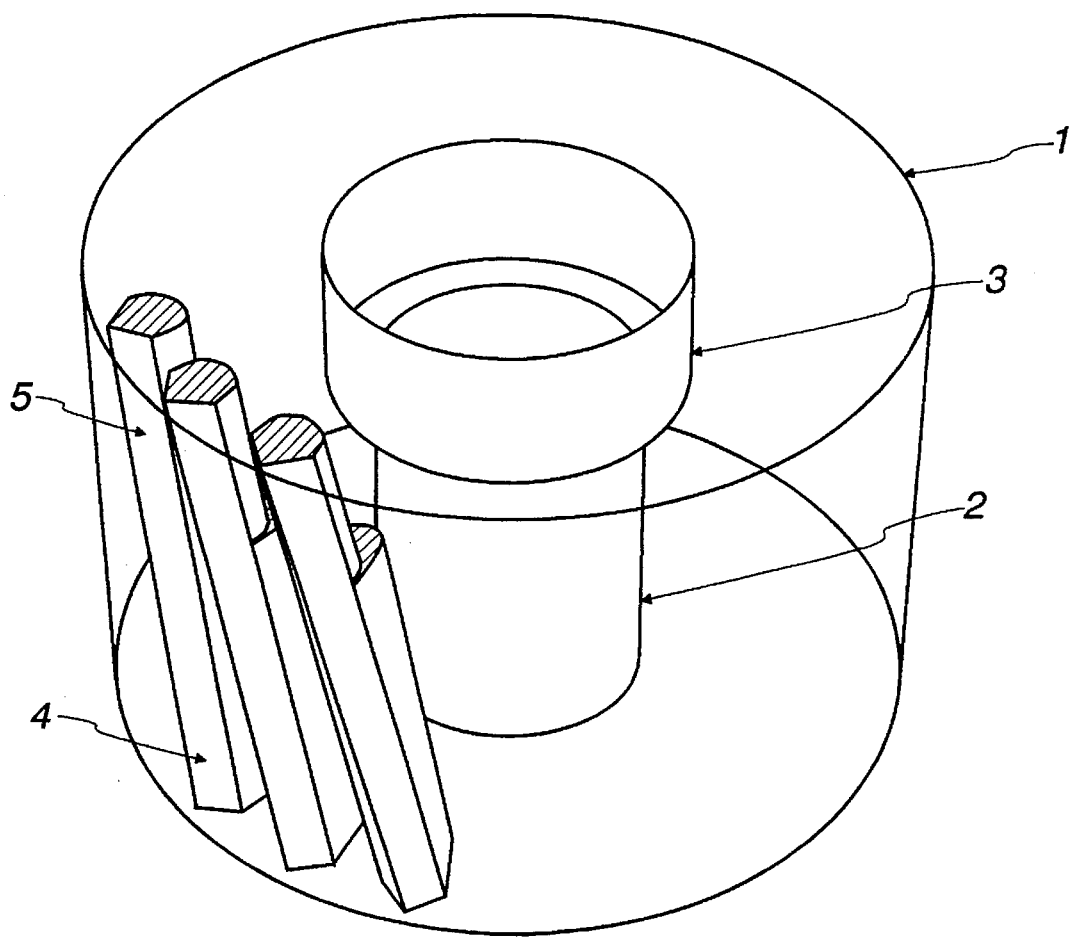

The core 1 shown in FIG. 1 has a spindle hole 2 with an increased internal diameter 3 for accomodating the motor bearing. The rotor is made of magnetically conductive material and contains a number of electric conductors arranged in the slots 4 in the core. The electric conductors are at both ends in connection with a short-circuiting ring-not shown. The electric conductors disposed in the slots 4 are designed with a varying sectional area in their longitudinal direction. It is shown in FIG. 1 that the slots have a different cross section in the slot area 5 adjacent the increased internal diameter 3.

Figure 2:
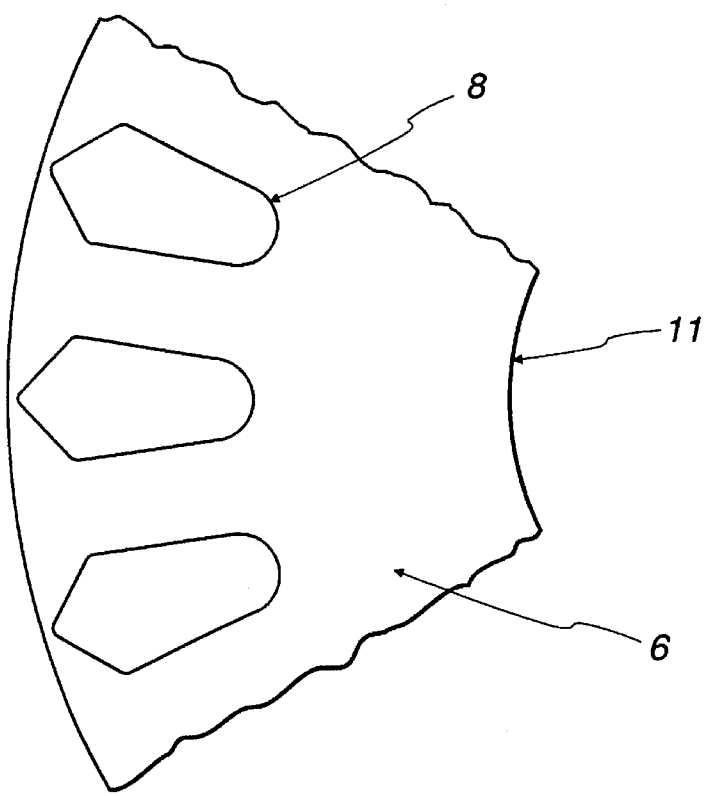
Figure 3:
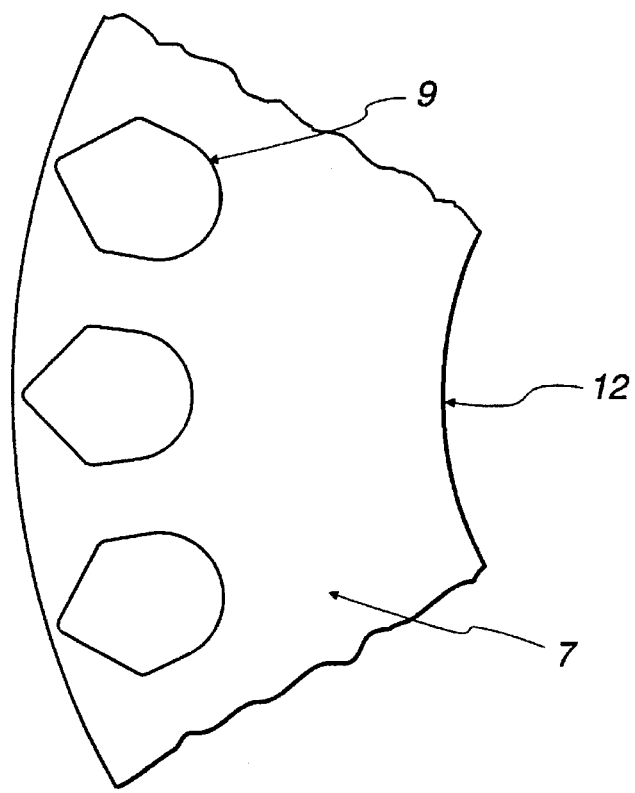

FIGS. 2 and 3 show portions of disks 6, 7 of the core 1. If the core is made as a stack of disks 6, 7 of magnetically conductive material, FIGS. 2 and 3 show a section of the disks 6, 7 from which the core is made up. FIG. 2 shows that the slots 4 are in the shape of a hole 8 in the disks 6. It appears by comparison of FIGS. 2 and 3 that the hole 9 has a different shape than the hole 8. The hole 9 corresponds to a cross-section in the slot area 5 in FIG. 1. FIGS. 2 and 3 show in the same manner the inside edge 11, 12 of the magnetically conductive disks, which in the inside edge of the area with a small spindle hole 2 is designated by 11, and in the inside edge of the area with increased internal diameter 3 spindle hole is designated by 12. If the core is constructed from plates, the plates would correspond to the disk 6, and need only be made in the two versions indicated in FIGS. 2 and 3. The result is that the production of the core 1 can be made largely in a traditional manner. However, by stacking the core it is possible to have an unlimited number of possible variations in the shape of the slots 4. It will therefore be possible to produce the core 1 with a large number of disks 6, 7. In principle there is nothing to prevent the stacked core 1 from being made so that the slots 4 form a gradual transition from the profile of the hole shown as 8 to the profile of the hole shown as 9. The core may also be a sintered unit where the electric conductors and the short-circuiting rings (not shown in the drawings) are made first. By a known powder technology the volume is filled with the conductors with aperture to spindle 2 and increased internal diameter 3. If the core 1 is made laminated, the slots 4 can with great advantage be filled with electrically conductive material with by a casting process. The casting has the advantage that complete filling is effected of the holes 8, 9 in the disks 6, 7.

I claim:

1. A rotor for an electric machine, especially for a motor for a hermetical refrigerating compressor, the rotor including a core of magnetically conductive material having a central spindle hole and having a number of axially extended slots filed with an electrically conductive material for formation of electric conductors in the rotor, and including short-circuiting rings for short-circuiting the conductors, the spindle hole having at least two different internal diameters, the improvement comprising the axially extended slots having varying profiles in their longitudinal direction with a sectional area of the slots being smaller where the sectional area of the spindle hole is larger, and being larger where the sectional area of the spindle hole is smaller, and said slots having a width in a direction towards center which is reduced in a part of the rotor where the spindle hole has a larger internal diameter.

2. Rotor according to claim 1, in which the core is produced by powder technology.

3. Rotor according to claim 1, in which the slots are filled by casting with electrically conductive material.

4. Rotor according to claim 1, in which the conductors which fill the slots are bars which are electrically connected to the short-circuiting rings.

5. Rotor according to claim 1, in which the core at least partially encircles the slots.

6. Rotor according to claim 1, in which the core is constructed of laminated, magnetically conductive material, in which a length-wise varying profile of the slots is achieved by giving the slots in the single layers of magnetically conductive material different shapes.

7. Rotor according to claim 1, in which the core is constructed of laminated, magnetically conductive material, in which a length-wise varying profile of the slots is achieved by giving the slots in the single layers of magnetically conductive material different sizes.

* * * * *